United States Patent
Eifert

(10) Patent No.: US 10,801,409 B2
(45) Date of Patent: Oct. 13, 2020

(54) SYSTEMS AND METHODS FOR SELECTIVELY AUGMENTING POWER OUTPUT OF A GAS TURBINE ENGINE

(71) Applicant: Rolls-Royce North American Technologies, Inc., Indianapolis, IN (US)

(72) Inventor: Andrew J. Eifert, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 304 days.

(21) Appl. No.: 15/658,531

(22) Filed: Jul. 25, 2017

(65) Prior Publication Data

US 2018/0038281 A1 Feb. 8, 2018

Related U.S. Application Data

(60) Provisional application No. 62/370,033, filed on Aug. 2, 2016.

(51) Int. Cl.
| | |
|---|---|
| *F02C 3/30* | (2006.01) |
| *F41H 13/00* | (2006.01) |
| *F02C 7/143* | (2006.01) |
| *F02C 7/04* | (2006.01) |
| *F01D 15/10* | (2006.01) |

(52) U.S. Cl.
CPC ............ *F02C 7/1435* (2013.01); *F01D 15/10* (2013.01); *F02C 3/305* (2013.01); *F02C 7/04* (2013.01); *F05D 2220/76* (2013.01); *F05D 2260/212* (2013.01); *F05D 2270/053* (2013.01); *F05D 2270/335* (2013.01); *F41H 13/0043* (2013.01)

(58) Field of Classification Search
CPC .......... F02C 3/305; F02C 3/30; F02C 7/1435; F41H 13/005
See application file for complete search history.

(56) References Cited

U.S. PATENT DOCUMENTS

| | | | | |
|---|---|---|---|---|
| 3,048,967 | A | * | 8/1962 | Carr .......................... C10L 1/10 60/210 |
| 3,434,281 | A | * | 3/1969 | Donaldson .............. F02C 3/305 60/39.15 |

(Continued)

*Primary Examiner* — William H Rodriguez
*Assistant Examiner* — David P. Olynick
(74) *Attorney, Agent, or Firm* — Shumaker & Sieffert, P.A.

(57) ABSTRACT

Systems and methods for augmenting power output when operating a load having relatively brief periods of high energy demand and high heat generation. A system comprises a gas turbine engine including a coolant injection assembly, an electrical generator coupled to the gas turbine engine, a high-energy operating load coupled to the electrical generator, and a cooling system adapted to provide cooling to the high-energy operating load. The cooling system is coupled and adapted to provide coolant to the coolant injection assembly of the gas turbine engine. A method comprises coupling the cooling system to the coolant injection assembly at the inlet of the gas turbine engine, selectively diverting at least a portion of the coolant of the cooling system to the coolant injection assembly, and spraying the diverted coolant into air entering the gas turbine engine.

19 Claims, 7 Drawing Sheets

(56) References Cited

U.S. PATENT DOCUMENTS

| | | | | |
|---|---|---|---|---|
| 3,518,023 | A * | 6/1970 | Britten | F02C 3/305 416/30 |
| 6,718,771 | B1 * | 4/2004 | Kopko | F02C 3/305 60/39.182 |
| 2004/0177618 | A1 * | 9/2004 | Placko | F02C 3/305 60/775 |
| 2005/0160736 | A1 * | 7/2005 | Reale | A63B 71/0605 60/772 |
| 2008/0250769 | A1 * | 10/2008 | Wagner | F01D 25/002 60/39.24 |
| 2009/0249794 | A1 * | 10/2009 | Wilkes | F02C 3/24 60/794 |
| 2011/0138817 | A1 * | 6/2011 | Vialle | F01D 15/12 60/775 |
| 2012/0248242 | A1 * | 10/2012 | Gagne | B64D 41/00 244/58 |
| 2015/0315965 | A1 * | 11/2015 | Moine | F02C 3/305 60/775 |
| 2016/0123456 | A1 * | 5/2016 | Goujet | B64C 27/12 184/6.4 |
| 2016/0229549 | A1 * | 8/2016 | Mitrovic | B64C 11/44 |
| 2017/0284535 | A1 * | 10/2017 | Ehinger | F16H 57/0442 |
| 2018/0172294 | A1 * | 6/2018 | Owen | F02C 7/052 |

\* cited by examiner

SYSTEMS AND METHODS FOR SELECTIVELY AUGMENTING POWER OUTPUT OF A GAS TURBINE ENGINE

CROSS REFERENCE TO RELATED APPLICATION

The present application claims priority to U.S. Provisional Patent Application No. 62/370,033, filed Aug. 2, 2016, the entirety of which is hereby incorporated by reference.

FIELD OF THE DISCLOSURE

The present disclosure relates generally to gas turbine engines, and more specifically to systems and methods for selectively and temporarily augmenting the power output of a gas turbine engine.

BACKGROUND

In certain high energy applications, a gas turbine engine may be coupled to an electrical generator to provide electrical power to high demand electrical equipment. During operation, the high demand electrical equipment may experience periods of relatively low loading, followed by brief periods of extremely high loading and heat generation. Once example of high demand electrical equipment is a directed energy weapon, which typically has low energy requirements when not preparing to fire but has brief periods of extremely high energy demand when preparing to fire. Any combination of gas turbine engine and electrical generator which provides power to high demand electrical equipment such as a directed energy weapon must necessarily be designed to handle the wide range of energy demand and rapid transients presented by such operations.

Under certain operating conditions such as high altitude and high ambient temperature, it may be difficult for a gas turbine engine and electrical generator to operate at its maximum output and thus meet the high energy demand of high demand electrical equipment such as a directed energy weapon. For this reason it may be desirable in some applications, when maximum power output of the turbine is not reached, to selectively and temporarily augment the power output of a gas turbine engine to meet the loading requirements of the high demand electrical equipment without resorting to carrying excess power capacity as its associated drawbacks, weight, cost, mobility etc.

SUMMARY

The present application discloses one or more of the features recited in the appended claims and/or the following features which, alone or in any combination, may comprise patentable subject matter.

According to an aspect of the present disclosure, a system is disclosed for augmenting power output when operating a load having relatively brief periods of high energy demand and high heat generation. The system comprises a gas turbine engine including a coolant injection assembly, a compressor, a combustor, and a turbine; an electrical generator coupled to the gas turbine engine; at least one high-energy operating load coupled to the electrical generator; a cooling system adapted to provide cooling to the at least one high-energy operating load; wherein the cooling system is coupled and adapted to provide coolant to the coolant injection assembly of the gas turbine engine.

In some embodiments the coolant system is adapted to selectively provide coolant during periods of high energy demand and high heat generation of the operating load. In some embodiments the coolant injection assembly comprises a plurality of nozzles in fluid communication with the cooling system, the plurality of nozzles disposed circumferentially about and upstream of an inlet of the gas turbine engine. In some embodiments the system further comprises a coolant mixer disposed between the cooling system and the plurality of nozzles, the coolant mixer adapted to mix coolant from the cooling system with at least one secondary fluid stream prior to the coolant passing through the plurality of nozzles. In some embodiments the coolant injection assembly is adapted to serve as an intercooler.

According to another aspect of the present disclosure, a method is presented for augmenting the power output of a gas turbine engine in an operating assembly, the operating assembly including an electrical generator coupled to the gas turbine engine and a high-energy operating load having a cooling system. The method comprises coupling the cooling system of the high-energy operating load to a coolant injection assembly at the inlet of the gas turbine engine; diverting at least a portion of the coolant of the cooling system to the coolant injection assembly; and spraying the diverted coolant into air entering the gas turbine engine.

In some embodiments the method further comprises mixing, prior to spraying the diverted coolant into air entering the gas turbine engine, the diverted coolant with a secondary flow of water. In some embodiments the method further comprises mixing, prior to spraying the diverted coolant into air entering the gas turbine engine, the diverted coolant with a secondary flow of alcohol. In some embodiments the resulting mixture of water and diverted coolant has a water-alcohol ratio of 2:1. In some embodiments the resulting mixture of alcohol and diverted coolant has a water-alcohol ratio of 2:1.

In some embodiments the diverted coolant is sprayed into air entering the gas turbine engine at a rate of between 0.5 and 0.75 gallons per minute. In some embodiments the method further comprises the steps of determining the environmental conditions proximate the turbine and the operational power output of the turbine given the environmental conditions; comparing the operational power output to a required load and injecting the coolant based upon the comparison. In some embodiments the environmental conditions are selected from the group consisting of altitude, temperature and air density. In some embodiments the step of determining operational power output comprises accessing empirical operational data associated with the turbine engine.

According to yet another aspect of the present disclosure, a method is disclosed of increasing the power output of a gas turbine engine in an operating assembly, the operating assembly including an electrical generator coupled to the gas turbine engine and a high-energy operating load having a cooling system. The method comprises coupling the cooling system of the high-energy operating load to a plurality of nozzles disposed upstream of an inlet of the gas turbine engine; and selectively diverting at least a portion of the coolant of the cooling system toward the plurality of nozzles; blending the diverted coolant with one or both of water and alcohol to form a blended fluid; and passing the blended fluid through the plurality of nozzles such that the blended fluid is entrained in air entering the gas turbine engine.

In some embodiments the method further comprises, prior to the step of passing the blended fluid through the plurality of nozzles: determining an operational power limit of the gas turbine engine based on environmental conditions proximate the gas turbine engine; determining the power output of the gas turbine engine; and selectively passing the blended fluid through the plurality of nozzles based on a comparison of the operational power limit and power output.

In some embodiments the method further comprises selectively passing the blended fluid through the plurality of nozzles when the power output is greater than the operational power limit. In some embodiments the method further comprises selectively passing the blended fluid through the plurality of nozzles when the power output is within a predetermined threshold of the operational power limit. In some embodiments the environmental conditions are selected from the group consisting of altitude, temperature and air density. In some embodiments the step of determining operational power output comprises accessing empirical operational data associated with the turbine engine.

BRIEF DESCRIPTION OF THE DRAWINGS

The following will be apparent from elements of the figures, which are provided for illustrative purposes and are not necessarily to scale.

Figure 1:
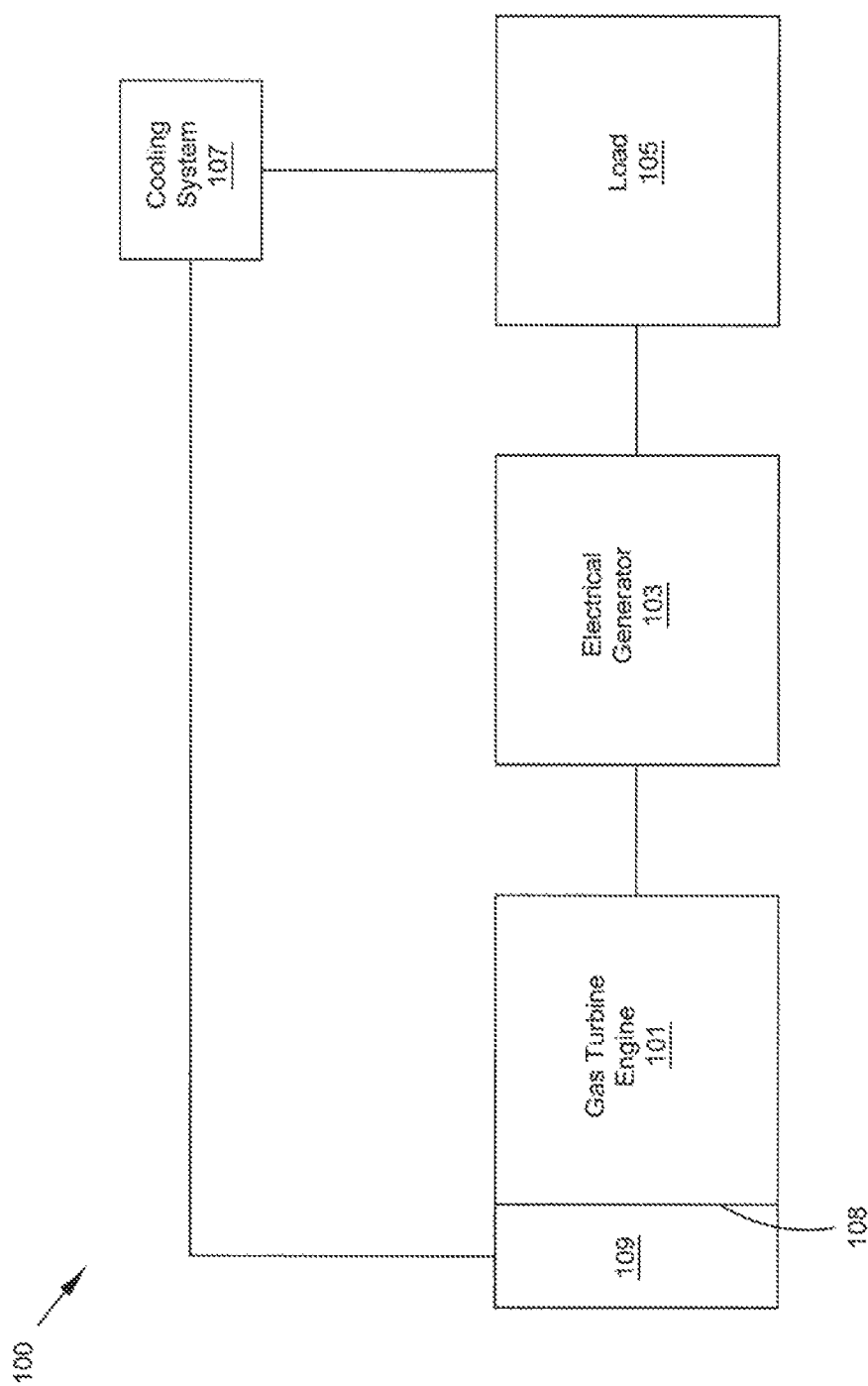
FIG. 1 is a schematic view of a system for selectively augmenting the power output of a gas turbine engine in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents systems and methods of operation for a high demand assembly comprising a gas turbine engine, an electrical generator, and a high demand electrical load. The presented systems and methods overcome the deficiencies noted above. Specifically, the presented systems and methods provide a selective and temporary augmentation to the power output of a gas turbine engine assembly by re-directing some coolant fluid from a cooling system associated with the high demand electrical load to an inlet assembly of the gas turbine engine. By spraying coolant such as water, a water-alcohol mix, or similar evaporative into the air entering the gas turbine engine, the power output of the engine may be increased without significant increases to the operating temperatures of the engine. The advantageous system disclosed herein is schematically depicted in FIGS. 1 and 2.

Figure 2:
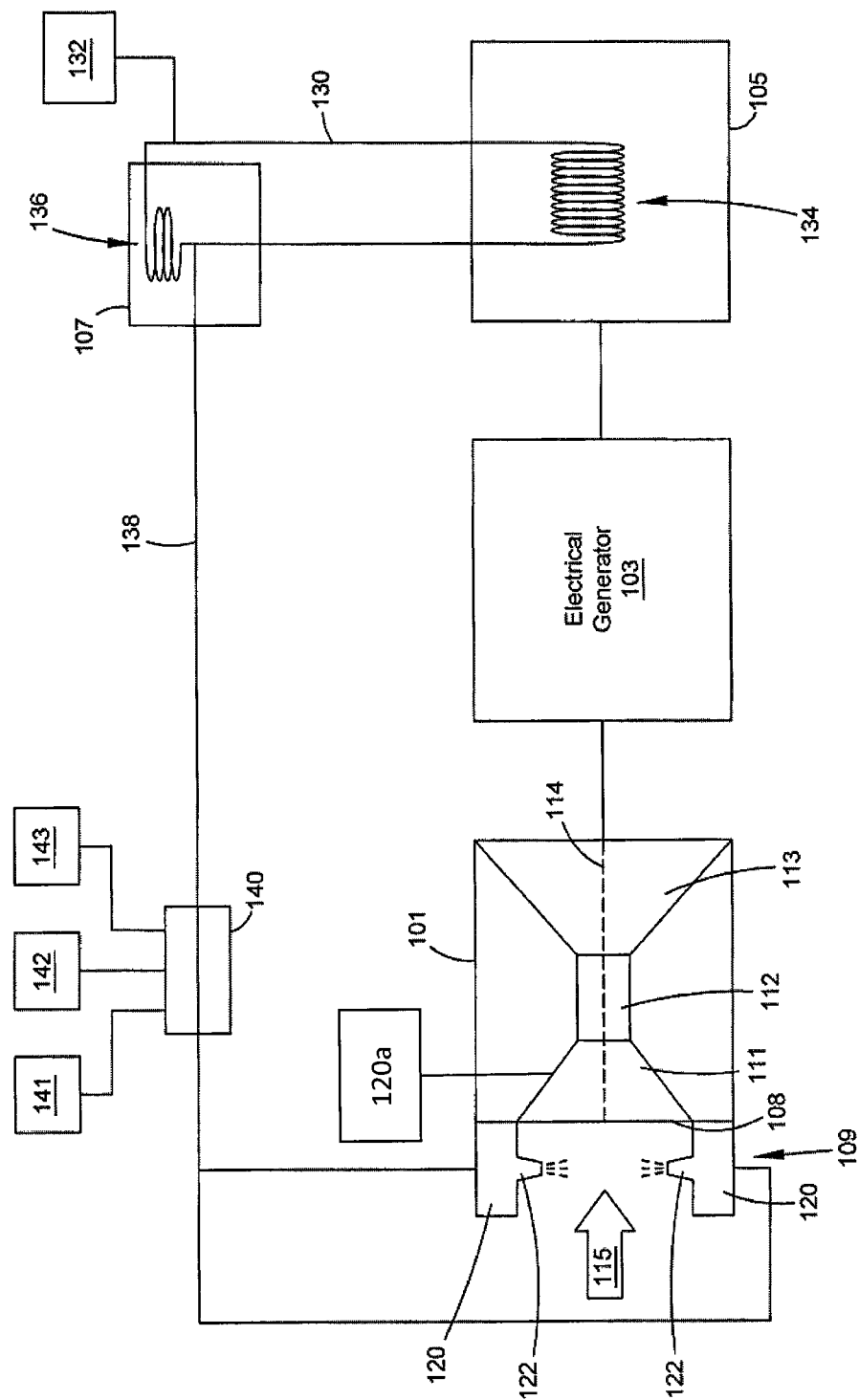
FIG. 2 is a schematic view of a system for selectively augmenting the power output of a gas turbine engine in accordance with some embodiments of the present disclosure.

FIG. 1 is a schematic view of one embodiment of a high demand assembly 100 comprising a gas turbine engine 101, an electrical generator 103, and a high demand electrical load 105. The electrical generator 103 may be coupled between the gas turbine engine 101 and the load 105. The gas turbine engine 101 outputs mechanical energy to the electrical generator 103, which converts the mechanical energy to electrical energy. The electrical energy output from the electrical generator 103 is used by the load 105.

Load 105 may be a piece of equipment having high-demand, high-heat generating characteristics. In some embodiments, load 105 may have periods of relatively low electrical loading followed by brief periods of extremely high electrical demand. For example, in some embodiments the load 105 is a directed energy weapon. In some embodiments the load 105 generates excessive heat which must be removed by a cooling system 107. In some high energy applications upwards of ⅔ of the electric power generated is given off in heat thus making a cooling system a necessity. The illustrated cooling system 107 is coupled to the load 105, and is adapted to remove heat from the load 105 in order to prevent overheating conditions in the equipment.

Cooling system 107 is additionally coupled to a coolant injection assembly 109 which is mounted to the inlet or upstream end of the gas turbine engine 101. During operation, coolant from the cooling system 107 may be selectively diverted to the coolant injection assembly and sprayed into the air entering the inlet of the gas turbine engine 101. Operating the gas turbine engine 101 with coolant entrained in the working fluid (air) allows for a greater power output without exceeding temperature limits of the engine.

In some embodiments the coolant of cooling system 107 is water. In other embodiments the coolant is one of alcohol or a water-alcohol mixture. In still further embodiments the coolant is an evaporative fluid.

FIG. 2 provides a more detailed schematic diagram of one embodiment of high demand assembly 100. Gas turbine engine 101 comprises a compressor 111, combustor 112, and turbine 113. The compressor 111 and turbine 113 may be coupled to a common shaft 114 which may be further coupled to electrical generator 103.

Coolant injection assembly 109 comprises an annular ring 120 mounted upstream of the compressor 111 and having a plurality of fluid nozzles 122 disposed circumferentially around the inner surface 121 of annular ring 120. Additionally, the annular ring 120 may be position within the compressor 111 functioning as an intercooler 120a as shown in FIG. 2. Nozzles 122 are adapted such that fluid passing therethrough under sufficient pressure will be sprayed radially inward into the flow of air 115 entering the gas turbine engine 101. Nozzles 122 are further adapted to receive coolant from cooling system 107.

Cooling system 107 may have a coolant loop 130 with a first heat exchanger 134 disposed within the load 105 and a second heat exchanger 136 disposed remote from the load 105. First heat exchanger is adapted to remove heat from load 105. In some embodiments the coolant in the coolant loop 130 is fed, as needed, from a coolant reservoir 132.

Coolant loop 130 is coupled to nozzles 122 via a diverting line 138. In some embodiments, a mixer 140 is disposed between the coolant loop 130 and nozzles 122 such that diverting line 138 passes through the mixer 140. One or more fluid reservoirs 141, 142, and 143 may be provided containing fluids which are mixed in to the diverted coolant in the diverting line 138 prior to being sprayed through nozzles 122.

In some embodiments, the coolant which is diverted from coolant loop 130 is water, and mixer 140 is adapted to mix the water coolant with alcohol contained in a fluid reservoir 141. The mixer 140 may be adapted to provide the water-alcohol mixture at a predetermined ratio, such as 2 parts water to 1 part alcohol, to the nozzles 122.

Figure 3:
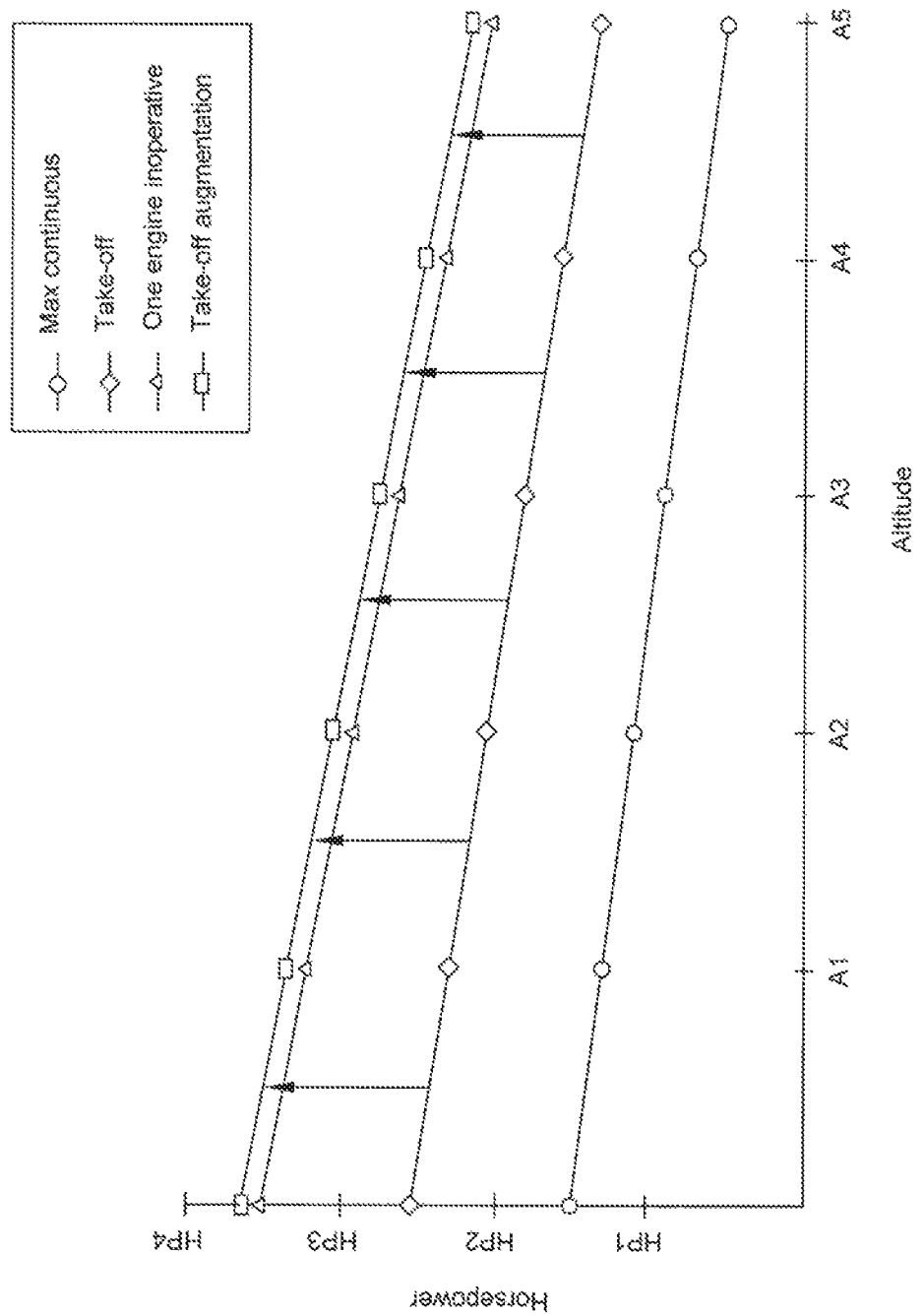
FIG. 3 is a graph of turbine engine operating limits in accordance with some embodiments of the present disclosure.

The safe operating envelope of a gas turbine engine is dependent on several operating conditions, including altitude and temperature. FIG. 3 is a graph of the operating limits of a gas turbine engine for a given temperature. Altitude is shown along the x-axis, with ascending altitudes of A1 through A5. Horsepower is shown along the y-axis, with ascending horsepower outputs of the gas turbine engine of HP1 through HP4.

As shown in FIG. 3, a first operating limit 301 is illustrated as a line with circle data points. This limit 301 is the limit for max continuous operations of the gas turbine engine. Operating the engine within this limit would provide an expected engine life in the thousands of hours. A second operating limit 302 is illustrated as a line with diamond shaped data points. This limit 302 is for take-off, when a gas turbine engine may be operated for a limited period (typically around 5 minutes) at higher power outputs. Operating the engine within the limit 302 would provide an expected engine life in the hundreds of hours. A third limit 303 is presented for engines designed to be used in dual-engine applications and is illustrated as a line with triangular data points. Operating the engine at limit 303 greatly reduces the expected life of the engine.

Through the use of the augmentation system and methods described herein, the operating limit 302 can be augmented to achieve a fourth operating limit 304 which is illustrated as a line with square data points. More specifically, the use of coolant entrained in inlet air to the gas turbine engine 101 decreases the compressor work while maintaining turbine work, thus increasing the net work obtained by the gas turbine cycle. Further, adding coolant to the inlet air cools internal engine parts, allowing the gas turbine engine 101 to be operated at a higher RPM without overheating.

In some embodiments, coolant which is diverted from coolant loop 130 is selectively sprayed through nozzles 122. For example, a comparison may be done between an operational power limit of the gas turbine engine 101 and the actual power output of the gas turbine engine 101, and coolant may be selectively sprayed through nozzles 122 based on that comparison.

The operational power limit may be determined by measuring or evaluating environmental conditions proximate the gas turbine engine 101 such as altitude, temperature, and air density. The operational power limit may be determined by measuring or evaluating parameters internal to the gas turbine engine 101. The actual power output of the gas turbine engine 101 may be determined by measuring engine performance parameters.

In some embodiments, coolant is selectively sprayed through nozzles 122 when the comparison shows that the power output is greater than the operational power limit. In other embodiments, a predetermined threshold is used to trigger selectively spraying coolant through nozzles 122. For example, coolant may be selectively sprayed when power output is within 5% of the operational limit, or when power output is within 50 shaft horsepower of the operational limit.

In still further embodiments the selective spraying of coolant through nozzles 122 is triggered by a signal from the load 105 indicating the start or impending start of a period of high demand.

In embodiments where coolant is blended prior to being sprayed through the nozzles 122, the blended fluid may be selectively sprayed through the nozzles 122 consistent with the principles outlined above.

Figure 5:
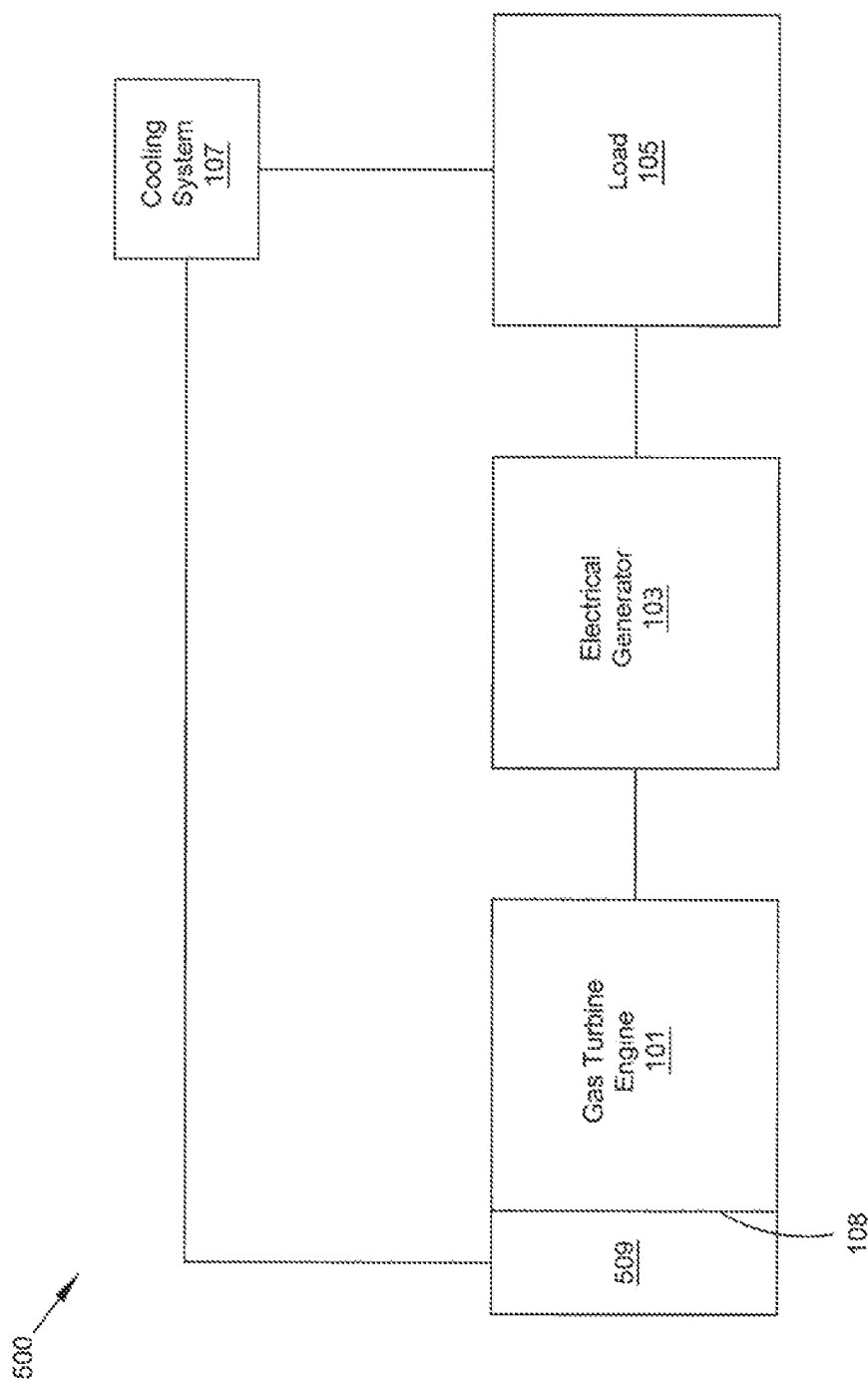
FIG. 5 is a schematic view of a system for selectively augmenting the power output of a gas turbine engine in accordance with some embodiments of the present disclosure.
Figure 6:
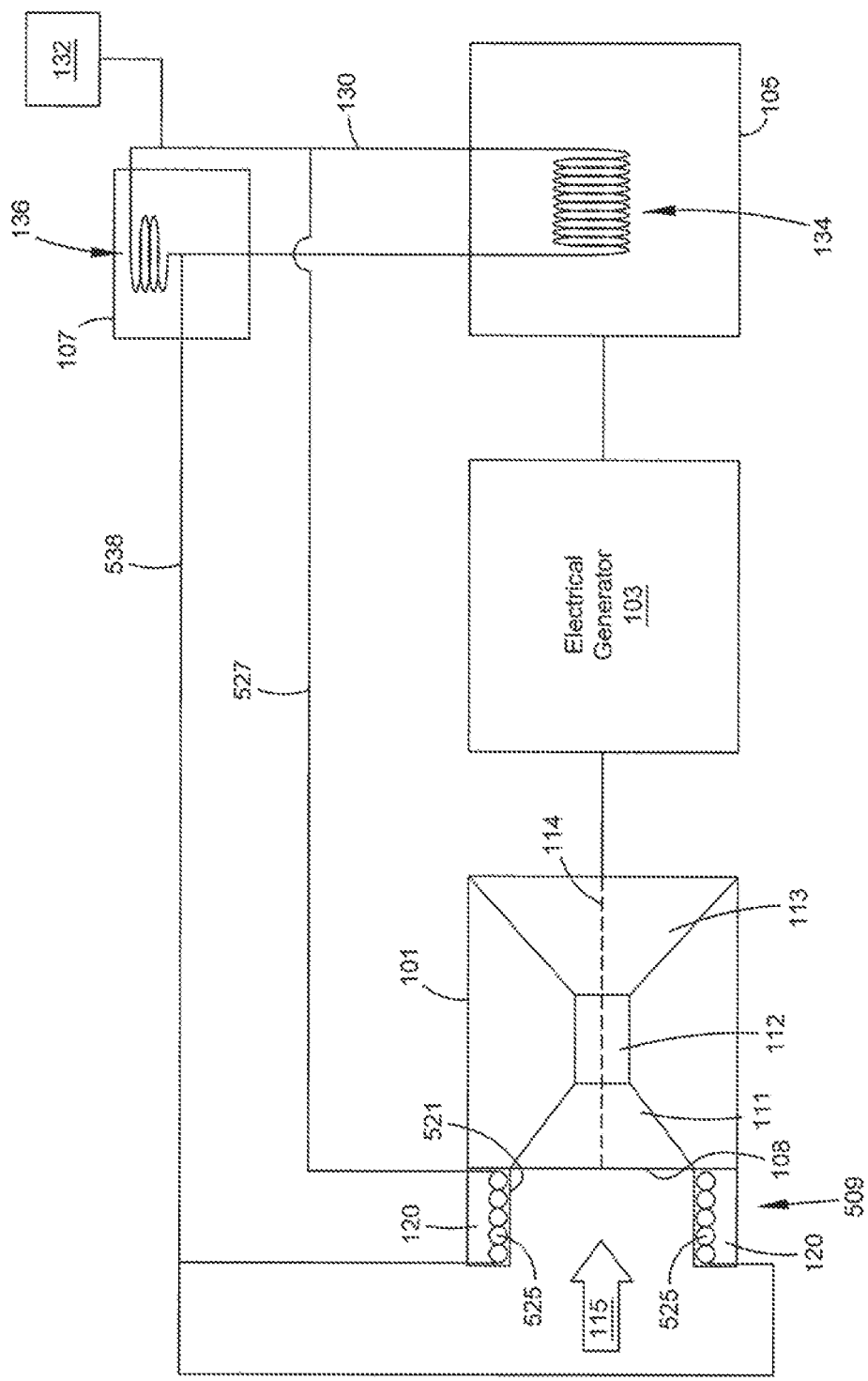
FIG. 6 is a schematic view of a system for selectively augmenting the power output of a gas turbine engine in accordance with some embodiments of the present disclosure.

In some embodiments of the present disclosure, coolant is used to indirectly cool the flow of air 115 entering the gas turbine engine 101 at inlet 108. FIGS. 5 and 6 present schematic views of such an embodiment. Indirect cooling is achieved by circulating coolant through a coolant circulation assembly 509 that may comprise an annular ring 520 having a plurality of coolant tubes 525, passages, or piping configured for the passage of coolant in an annular fashion about the inlet 108. Coolant circulation assembly may be mounted at or forward of inlet 108.

FIG. 5 is a schematic view of one embodiment of a high demand assembly 500 comprising a gas turbine engine 101, an electrical generator 103, and a high demand electrical load 105. A cooling system 107 is coupled to the load 105, and is adapted to remove heat from the load 105 in order to prevent overheating conditions in the equipment. Cooling system 107 is additionally coupled to a coolant circulation assembly 509 which is mounted to the inlet or upstream end of the gas turbine engine 101. During operation, coolant from the cooling system 107 may be selectively diverted to the coolant circulation assembly 509 and circulated about the assembly 509 to indirectly cool the air entering the inlet of the gas turbine engine 101. Operating the gas turbine engine 101 with a pre-cooled working fluid (air) allows for a greater power output without exceeding temperature limits of the engine.

In some embodiments the coolant of cooling system 107 is water. In other embodiments the coolant is one of alcohol or a water-alcohol mixture. In still further embodiments the coolant is an evaporative fluid.

FIG. 6 provides a more detailed schematic diagram of one embodiment of high demand assembly 500. Gas turbine engine 101 comprises a compressor 111, combustor 112, and turbine 113. The compressor 111 and turbine 113 may be coupled to a common shaft 114 which may be further coupled to electrical generator 103.

Coolant circulation assembly 509 comprises an annular ring 520 mounted upstream of the compressor 111 and having a plurality of fluid tubes or passages 525 disposed radially outward from the annular inner surface 521 of annular ring 520. Tubes 525 are adapted such that fluid passing therethrough under sufficient pressure will be circulated about the annular ring 520 before returning via return passage 527 to second heat exchanger 136. Coolant circulating about the annular ring 520 is sufficient to reduce the temperature of inner surface 521, and thus is capable of reducing the temperature of air 115 entering the turbine engine.

Additional aspects of cooling system 107 are substantially as described above with reference to FIG. 2. Cooling system 107 may have a coolant loop 130 with a first heat exchanger 134 disposed within the load 105 and a second heat exchanger 136 disposed remote from the load 105. First heat exchanger is adapted to remove heat from load 105. In some embodiments the coolant in the coolant loop 130 is fed, as needed, from a coolant reservoir 132.

Coolant loop 130 is coupled to tubes 525 via a diverting line 538.

In some embodiments, coolant diverted to the coolant circulation assembly 509 may be at an approximate temperature of 80° F. Although this temperature is hotter than most standard day design considerations (typically 59° F.), the cooling provided by 80° F. coolant circulating through the coolant circulation assembly 509 would still be significant when the gas turbine engine 101 is operated in high temperature environments such as the design 1% hot day considerations.

Figure 4:
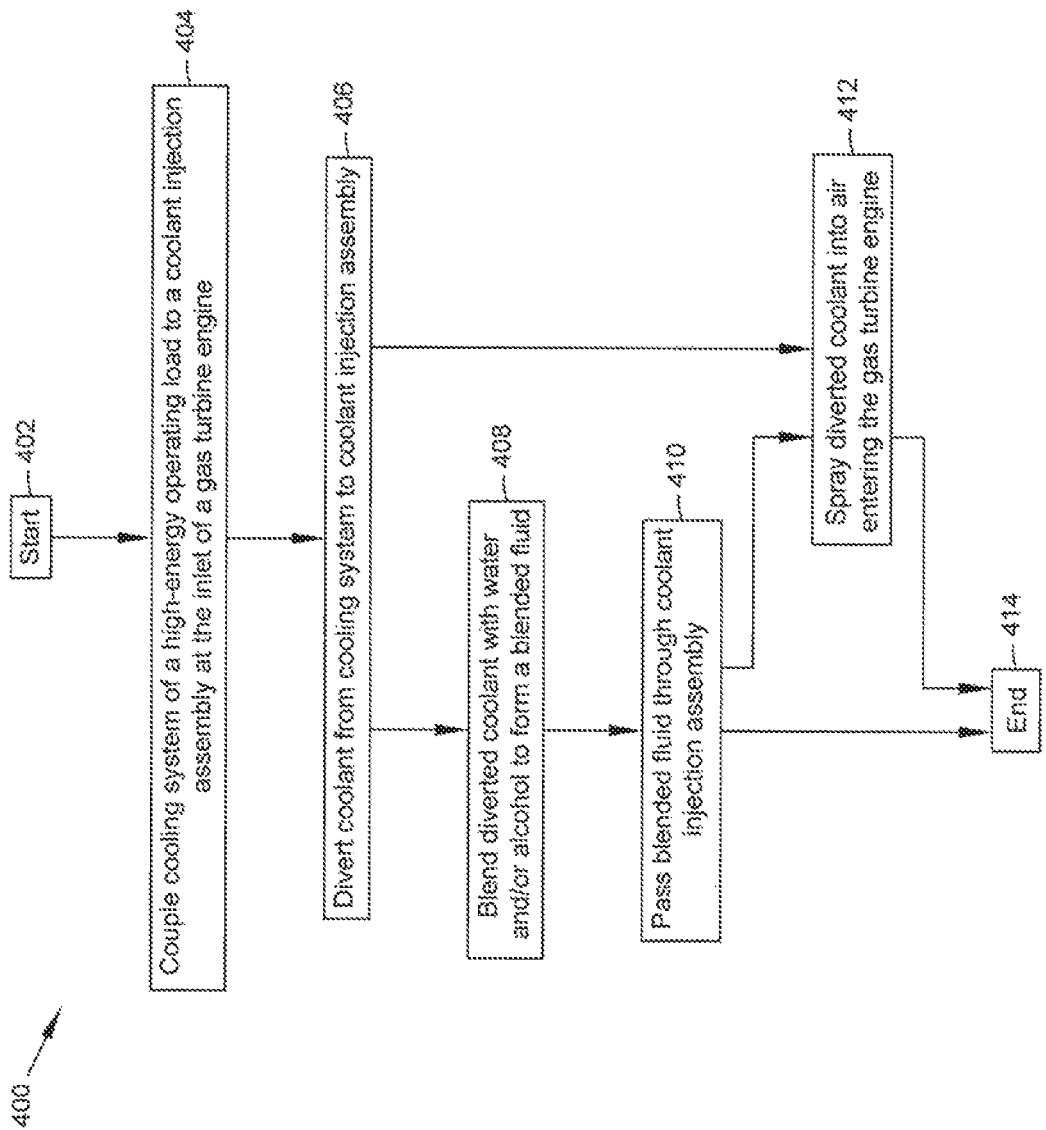
FIG. 4 is a flow diagram of a method in accordance with some embodiments of the present disclosure.

Methods are further provided for augmenting the power output of a gas turbine engine. FIG. 4 presents a flow diagram of a method 400 in accordance with some embodiments. A method 400 may begin at step 404 with coupling a coolant system 107 associated with a load 105 to a coolant injection assembly 109 mounted to the inlet 108 of a gas turbine engine 101. Coolant may then be selectively diverted from the cooling system 107 to the coolant injection assembly 109 at step 406. In some embodiments the method 400 proceeds to step 412, and coolant is passed through the nozzles 122 of the coolant injection assembly 109 and sprayed into the airflow entering the inlet 108 of the gas turbine engine 101. The coolant is entrained in the working fluid of the gas turbine engine 101, allowing for higher power output without overheating the engine 101.

In some embodiments, method 400 may optionally include steps 408 and 410, which comprise selectively mixing or blending the diverted coolant with secondary fluid streams, such as water, alcohol, or other evaporative fluids. In some embodiments, the diverted coolant is selectively mixed to achieve a predetermined ratio of constituent members. For example, the diverted fluid may be mixed to achieve a 2:1 ratio of water to alcohol. At step 410, the blended fluid is passed through the nozzles 122 of the coolant injection assembly 109 and sprayed into the airflow entering the inlet 108 of the gas turbine engine 101.

In some embodiments a method may include spraying the diverted coolant or the diverted coolant mixture through the plurality of spray nozzles 122 at a predetermined flow rate. In some embodiments that flow rate may be between 0.5 and 0.75 gallons per minute. In other embodiments that flow rate may be between 0.5 and 1.0 gallons per minute.

In some embodiments a method may include spraying the diverted coolant or the diverted coolant mixture through the plurality of spray nozzles 122 at a predetermined pressure. In some embodiments that pressure may be approximately 50 psi.

Figure 7:
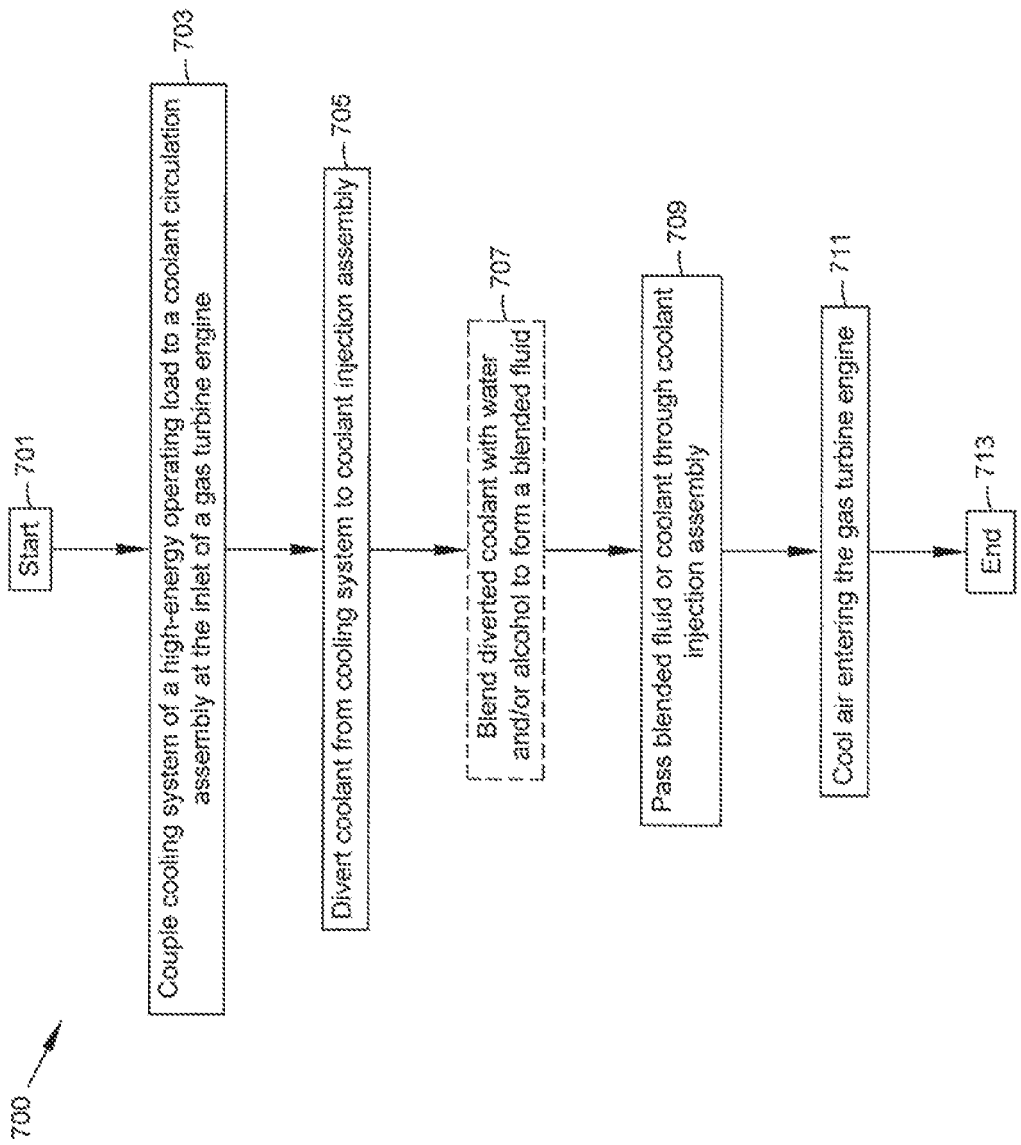
FIG. 7 is a flow diagram of a method in accordance with some embodiments of the present disclosure.

FIG. 7 presents a flow diagram of a method 700 in accordance with some embodiments. Method 700 starts at Block 701. At Block 703, a cooling system 107 associated with a load 105 may be coupled to a coolant circulation assembly 509 mounted to the inlet 108 of a gas turbine engine 101. Coolant may then be selectively diverted from the cooling system 107 to the coolant circulation assembly 509 at Block 705.

In some embodiments the method 700 optionally proceeds to Block 707 where the diverted coolant may be selectively mixed or blended with secondary fluid streams, such as water, alcohol, or other evaporative fluids. In some embodiments, the diverted coolant is selectively mixed to achieve a predetermined ratio of constituent members. For example, the diverted fluid may be mixed to achieve a 2:1 ratio of water to alcohol.

At Block 709, the coolant (or blended fluid if the method 700 includes optional Block 707) is communicated to the coolant circulation assembly 509. The coolant or blended fluid is circulated through a plurality of tubes 525 in the assembly 509 to cool the radially inner surface of the inlet flowpath. This cooling action results, at Block 711, in the cooling of air entering the gas turbine engine 101. This cooling effect allows for higher power output without overheating the engine 101.

Method 700 ends at Block 713.

The present disclosure provides many advantages over prior assemblies for meeting high electrical demand loads. The disclosed system allows a gas turbine engine to selectively and temporarily increase its power output, and thus increase the electrical output of a coupled electrical generator to meet the high demand of a load, through the diversion of coolant which is then sprayed into the working fluid of the gas turbine engine. Diverting coolant away from the cooling system associated with the load has a minimal impact on cooling the load and allows the gas turbine engine to operate at a higher power output for brief periods without exceeding operating temperature limits. Thus, the disclosed systems and methods allow for rapidly meeting high electrical demands of loads such as directed energy weapons.

Although examples are illustrated and described herein, embodiments are nevertheless not limited to the details shown, since various modifications and structural changes may be made therein by those of ordinary skill within the scope and range of equivalents of the claims.

What is claimed is:

1. A system for augmenting power output when operating a high-energy electrical load having periods of high energy demand and high heat generation, the system comprising:
   a gas turbine engine including a coolant injection assembly, a compressor, a combustor, and a turbine:
   an electrical generator coupled to the gas turbine engine;
   the high-energy electrical load coupled to the electrical generator, the high-energy electrical load having the periods of high energy demand and high heat generation;
   a cooling system adapted to provide cooling to the high-energy electrical load;
   the cooling system comprising a coolant loop including:
      a first heat exchanger in thermal contact with the at least one high-energy electrical load;
      a second heat exchanger remote from the at least one high-energy electrical load;
   wherein coolant is circulated through the coolant loop;
   a diverting line fluidly coupling the coolant loop to the coolant injection assembly;
   wherein the cooling system is coupled and adapted to provide coolant used in the coolant loop, via the diverting line, to the coolant injection assembly of the gas turbine engine, including, during the periods of high energy demand and high heat generation of the high-energy electrical load, selectively providing, via the diverting line, the coolant used in the coolant loop to the coolant injection assembly, wherein the coolant injection assembly injects the coolant into the intake of the gas turbine engine to increase the power output of the gas turbine engine to meet the high energy demand of the high-energy electrical load.

2. The system of claim 1 wherein the coolant injection assembly comprises a plurality of nozzles in fluid communication with the cooling system, the plurality of nozzles disposed circumferentially about and upstream of an inlet of the gas turbine engine.

3. The system of claim 2 further comprising a coolant mixer disposed between the cooling system and the plurality of nozzles, the coolant mixer adapted to mix coolant from the cooling system with at least one secondary fluid stream prior to the coolant passing through the plurality of nozzles.

4. The system of claim 1, wherein the coolant injection assembly is adapted to serve as an intercooler.

5. A method of augmenting the power output of a gas turbine engine in an operating assembly, the operating assembly including an electrical generator coupled to the gas turbine engine and a high-energy electrical load having a cooling system, the method comprising:
transferring energy from the high-energy electrical load via the cooling system by passing a coolant through a heat exchanger coupled to the high-energy electrical load and transferring the transferred energy from the coolant by passing the coolant through a second heat exchanger, wherein the coolant circulates between the heat exchanger and the second heat exchanger in a coolant loop, the second heat exchanger being remote from the high-energy electrical load, and the high-energy electrical load having periods of high energy demand and high heat generation;
operating the gas turbine engine to supply mechanical energy to the electrical generator, the electrical generator converting the mechanical energy to electrical energy;
transferring the electrical energy to the high-energy electrical load;
coupling the cooling system of the high-energy electrical load to a coolant injection assembly at an inlet of the gas turbine engine via a diverter line coupled to the coolant loop;
during the periods of high energy demand and high heat generation of the high-energy electrical load, diverting, via the diverter line, at least a portion of the coolant of the cooling system from the coolant loop to the coolant injection assembly; and
spraying the diverted coolant into air entering the gas turbine engine to increase the power output of the gas turbine engine to meet the high energy demand of the high-energy electrical load.

6. The method of claim 5, further comprising: mixing, prior to spraying the diverted coolant into air entering the gas turbine engine, the diverted coolant with a secondary flow of water.

7. The method of claim 5, further comprising: mixing, prior to spraying the diverted coolant into air entering the gas turbine engine, the diverted coolant with a secondary flow of alcohol.

8. The method of claim 6, wherein the resulting mixture of water and diverted coolant has a water-alcohol ratio of 2:1.

9. The method of claim 7, wherein the resulting mixture of alcohol and diverted coolant has a water-alcohol ratio of 2:1.

10. The method of claim 5, wherein the diverted coolant is sprayed into air entering the gas turbine engine at a rate of between 0.5 and 0.75 gallons per minute.

11. The method of claim 5, further comprising the steps of determining environmental conditions proximate the gas turbine engine and operational power output of the turbine given the environmental conditions; comparing the operational power output to a required load and injecting the coolant based upon the comparison.

12. The method of claim 11 wherein the environmental conditions are selected from the group consisting of altitude, temperature and air density.

13. The method of claim 11 wherein the step of determining operational power output comprises accessing empirical operational data associated with the turbine engine.

14. A method of increasing the power output of a gas turbine engine in an operating assembly, the operating assembly including an electrical generator coupled to the gas turbine engine and a high-energy electrical load having a cooling system, the method comprising:
transferring energy from the high-energy electrical load via the cooling system by passing a coolant through a heat exchanger coupled to the high-energy electrical load and transferring the transferred energy from the coolant by passing the coolant through a second heat exchanger wherein the coolant circulates between the heat exchanger and the second heat exchanger in a coolant loop, the second heat exchanger being remote from the high-energy electrical load, and the high-energy electrical load having relatively brief periods of high energy demand and high heat generation;
operating the gas turbine engine to supply mechanical energy to the electrical generator, the electrical generator converting the mechanical energy to electrical energy;
transferring the electrical energy to the high-energy electrical load;
coupling the cooling system of the high-energy electrical load to a plurality of nozzles disposed upstream of an inlet of the gas turbine engine via a diverter line coupled to the coolant loop:
during the periods of high energy demand and high heat generation of the high-energy electrical load, selectively diverting, via the diverter line, at least a portion of the coolant of the cooling system from the coolant loop toward the plurality of nozzles;
blending the diverted coolant with one or both of water and alcohol to form a blended fluid; and
passing the blended fluid through the plurality of nozzles such that the blended fluid is entrained in air entering the gas turbine engine to increase the power output of the gas turbine engine to meet the high energy demand of the high-energy electrical load.

15. The method of claim 14 further comprising, prior to the step of passing the blended fluid through the plurality of nozzles:
determining an operational power limit of the gas turbine engine based on environmental conditions proximate the gas turbine engine;
determining the power output of the gas turbine engine; and
selectively passing the blended fluid through the plurality of nozzles based on a comparison of the operational power limit and power output.

16. The method of claim 15 further comprising selectively passing the blended fluid through the plurality of nozzles when the power output is greater than the operational power limit.

17. The method of claim 15 further comprising selectively passing the blended fluid through the plurality of nozzles when the power output is within a predetermined threshold of the operational power limit.

18. The method of claim 15 wherein the environmental conditions are selected from the group consisting of altitude, temperature and air density.

19. The method of claim 18 wherein the step of determining operational power output comprises accessing empirical operational data associated with the gas turbine engine.

\* \* \* \* \*